UNITED STATES PATENT OFFICE.

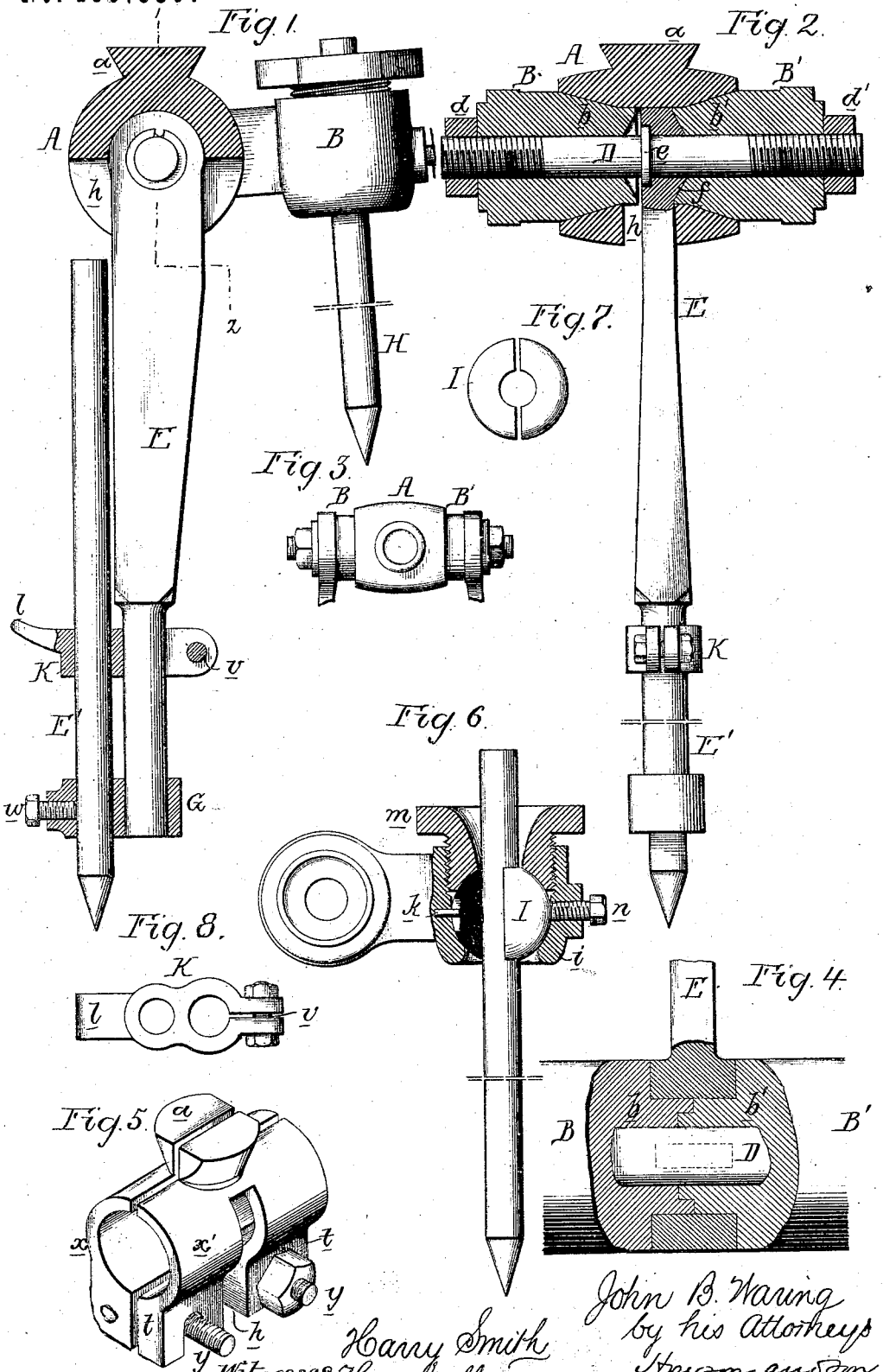

JOHN B. WARING, OF NEW YORK, N. Y., ASSIGNOR TO WARING ROCK-DRILL COMPANY, OF SAME PLACE.

IMPROVEMENT IN TRIPODS FOR ROCK-DRILLING MACHINES.

Specification forming part of Letters Patent No. 169,389, dated November 2, 1875; application filed July 8, 1875.

*To all whom it may concern:*

Be it known that I, JOHN B. WARING, of New York city, State of New York, have invented certain Improvements in Tripods for Rock-Drilling-Machines, of which the following is a specification:

The main objects of my invention are to dispense with the costly forked legs of tripods for rock-drills, and to afford facilities for adjusting the legs, and firmly securing the same. These objects I attain in the manner which I will now proceed to describe, reference being had to the accompanying drawing, in which—

Figure 1 is a vertical section of my improved tripod; Fig. 2, a section on the line 1 2; Fig. 3, a plan view of the tripod, and Figs. 4, 5, 6, and 7, detached views, illustrating different parts and modifications of my invention.

The head of the tripod, as shown in Figs. 1, 2, and 3, consists of three main parts—namely, the central portion A and the leg-carrying arms B and B', the central portion having a beveled projection for attachment to the adjustable shell for supporting the cylinder of the rock-drilling machine. The said central portion A has at each end a conical recess for receiving the conical portion $b$ of one of the arms B and B', and a pin, D, passes through both projections, and through the upper end of the rear leg E of the tripod, the pin being threaded at one end for the reception of a nut, $d$, and at the opposite end for the reception of the nut $d'$. Each of the arms B and B' carries a leg, H, which is made adjustable on the arm in the manner described hereafter. A collar, $e$, on the pin D bears against one side of the upper end of the leg E, the opposite side of which has a conical projection, $f$, adapted to a conical recess in the hub $b'$ of the leg-socket B'.

It will be evident that by tightening or loosening the nut $d$ the arm B may be firmly secured to the central portion A, or set so free from the same as to permit the ready adjustment of the said arm, and, on tightening the nut $d'$, both the leg E and arm B will be secured firmly together and to the central piece E, the said leg bearing against one side of a slot, $h$, which is made in the said central portion for the purpose of permitting the free movement of the leg when the nut $d'$ has been loosened.

By the above combination of parts I am enabled to dispense with the forked top, in which one leg of a rock-drill tripod usually terminates, the leg E, instead of being forked, having a simple eye for the reception of the pin D.

The conical bearings above described are not indispensable; but I prefer them as affording the means of firmly securing the parts together. The two projections $b$ and $b'$ of the two arms B and B' may be fitted together and to the upper end of the leg E, as shown in Fig. 4, which will be readily understood without explanation.

I prefer to make the central portion A of the head of the tripod in the form of a clamp, as shown in the perspective view, Fig. 5, the clamp being in two parts, $x$ $x'$, arranged to embrace the pin D, and the two parts having the above-mentioned slot $h$ for the reception and free movement of the rear leg E of the tripod. The two parts $x$ and $x'$ are connected together by bolts $y$ hinged to one-half of the clamp, and passing through slots in the flange $t$ of the other half, so that the two halves can be readily disconnected. After the beveled projection $a$, one-half of which is cast on one part, and the other on the other part of the clamp, has been introduced into the recess of the shell which supports the drill-cylinder, and the nuts of the bolts $y$ $g$ have been tightened, the projection $a$ will be tight in its recess and the clamp will tightly embrace the pin D. A leg, H, is connected to each of the arms B and B' through the medium of a ball-and-socket joint. (Best observed in Figs. 6 and 7.) A sphere, I, made in two parts, and arranged to embrace the leg, is contained in a socket, $i$, formed in the end of each of the arms B and B', and is confined to the same by a screw-follower, $m$, so that the leg admits of being adjusted in every direction to a limited extent, and secured after adjustment by a set-screw, $n$, which causes the two halves of the sphere to tightly embrace the leg, while the sphere itself is secured by the follower. A pin, $k$, projects into a recess in one-half of the sphere and prevents the latter from turning, and insures the presentation of the other half of the sphere in its proper position for being acted on by the set-screw $n$.

I prefer to make the rear leg in two parts—namely, the upper portion E, above referred to, and the lower portion E', the latter consisting of a simple rod pointed at the end. The lower end of the upper portion E is connected to the rod E' by a coupling, G, the screw $w$ of which secures the two together, further security being afforded by the clamp K, which is connected to the rod E and made by a screw, $v$, to embrace the portion E of the leg, so that on loosening the screws $v$ and $w$ the rod E' may be adjusted to any desired position. The clamp K has a curved projection, $l$, for receiving a weight to steady the leg.

I claim as my invention—

1. The within-described tripod-head, composed of a central portion, A, with its slot $h$, and the leg-carrying arms B and B', combined with the bolt D and upper end of the leg E, all substantially as set forth.

2. The slotted clamp, consisting of two parts, $x\ x'$, connected together, and having a slot, $h$, and beveled projection $a$, all substantially as set forth.

3. The central portion A, having conical recesses, the arms B and B', having conical projections, combined with the cone-shaped projection $f$ of the leg E, and with a bolt, D, all substantially as set forth.

4. The combination of each arm B and B', the socket $i$ and leg H, with the severed sphere I, follower $m$, and set-screw $n$.

In testimony whereof I have signed my name to this specification in the presence of two subscribing witnesses.

J. B. WARING.

Witnesses:
EDWARD H. ECKFELDT,
HARRY SMITH.